June 10, 1924.  
W. F. FRASER  
1,497,170  
CAM CONTROLLED REVERSING MECHANISM FOR MACHINE TOOL TABLES  
Filed May 5, 1922  3 Sheets-Sheet 1
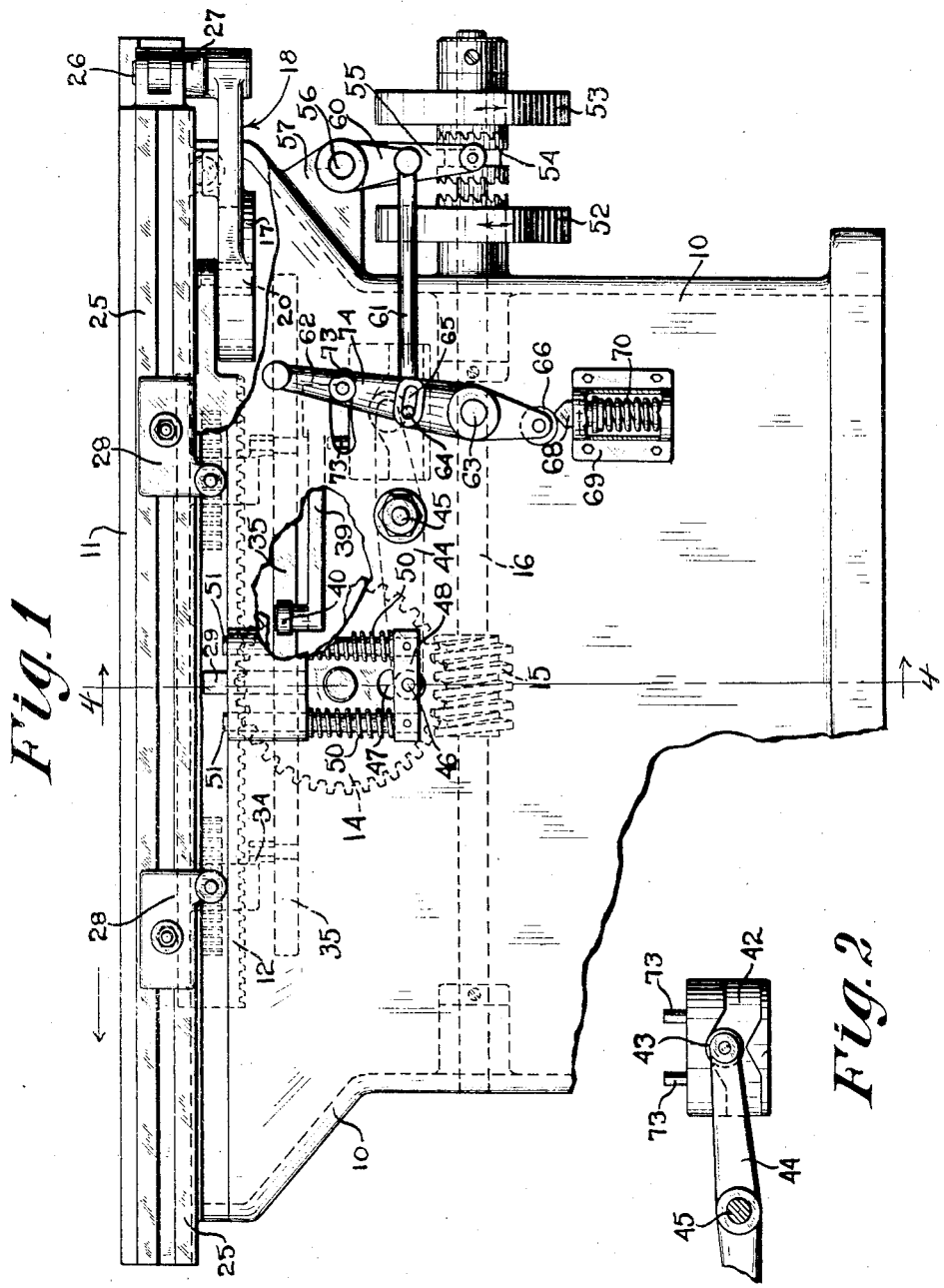
WITNESSES.  
John A. Glenna  
Harold W. Eaton
INVENTOR  
Warren F. Fraser.  
BY  
Clayton L. ...  
ATTORNEY June 10, 1924.  
W. F. FRASER  
1,497,170  
CAM CONTROLLED REVERSING MECHANISM FOR MACHINE TOOL TABLES  
Filed May 5, 1922  3 Sheets-Sheet 2

WITNESSES  
INVENTOR  
Warren F. Fraser.  
BY  
ATTORNEY

June 10, 1924. 1,497,170
W. F. FRASER
CAM CONTROLLED REVERSING MECHANISM FOR MACHINE TOOL TABLES
Filed May 5, 1922 3 Sheets-Sheet 3
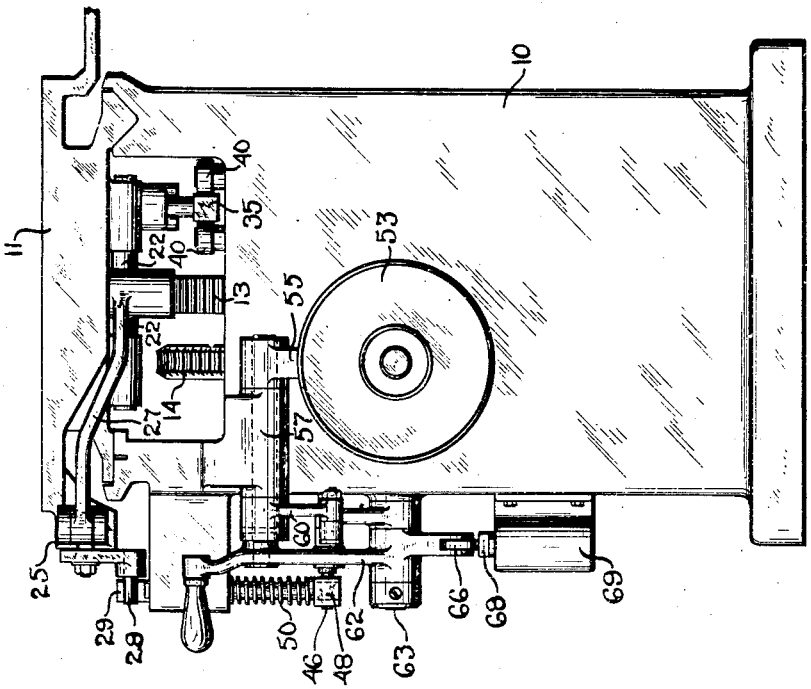
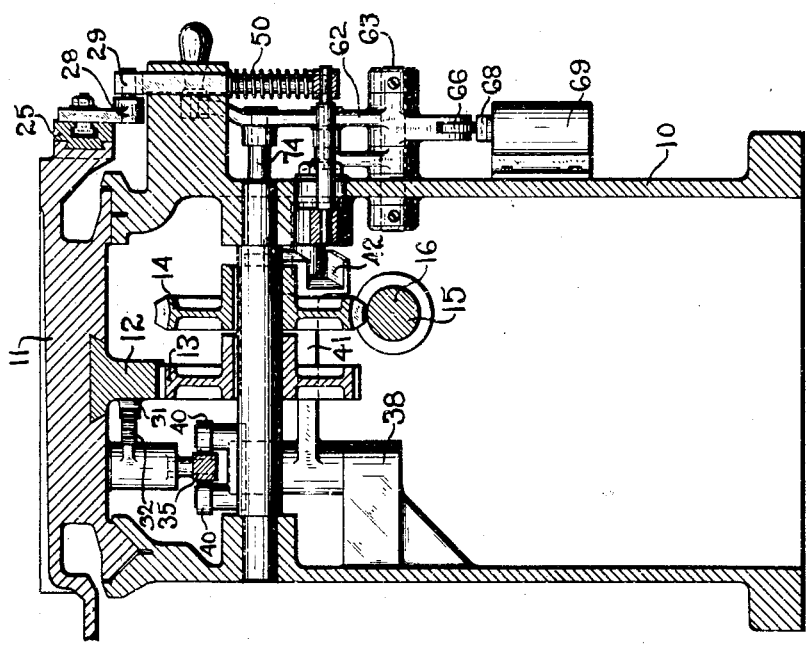
WITNESSES
INVENTOR
*Warren F. Fraser*
BY
ATTORNEY Patented June 10, 1924.

1,497,170

UNITED STATES PATENT OFFICE.

WARREN F. FRASER, OF WESTBORO, MASSACHUSETTS, ASSIGNOR TO NORTON COMPANY, OF WORCESTER, MASSACHUSETTS, A CORPORATION OF MASSACHUSETTS.

CAM-CONTROLLED REVERSING MECHANISM FOR MACHINE-TOOL TABLES.

Application filed May 5, 1922. Serial No. 558,576.

*To all whom it may concern:*

Be it known that I, WARREN F. FRASER, a citizen of the United States of America, residing at Westboro, in the county of Worcester and State of Massachusetts, have invented certain new and useful Improvements in Cam-Controlled Reversing Mechanisms for Machine-Tool Tables, of which the following is a full, clear, and exact specification.

My invention relates to a reversing and driving mechanism for machine tools, such as grinding machines, planers and milling machines, and more particularly to a mechanism whereby an easy stop and start is obtained in reversing rapidly moving reciprocating tables.

In a grinding machine, for example, which has a heavy reciprocating table, it is often impracticable to move the table very rapidly, due to the shocks and vibrations caused at reversal detrimentally affecting the grinding action, unless some means is provided to stop and start the table gradually. Various types of reversing mechanisms have been proposed in which either a gradual stop or a gradual start or both is obtained. In all of these an axial movement of the drive worm controlled by a cam mechanism is employed to neutralize the driving effect upon the table and thereby obtain a gradual slowing down or starting. Such mechanisms have not involved a completely controlled cam action during reversal, consequently the stopping or starting action is sometimes affected by variations in friction and load and slippage of the cams and followers.

It is accordingly an object of my invention to eliminate this difficulty and to provide a mechanism which is controlled during the starting and stopping action to obtain an easy reversal. This object is accomplished by employing a slidably mounted driving member on the table which is connected to the table through a positively actuated cam so controlled in its movement as to cause relative motion between the driver and the table and permit the latter to come gradually to rest and to be easily started again into motion. Further objects will be apparent from the following disclosure.

In the drawings in which like reference numerals indicate like parts:

Figure 1 is a front view of a machine tool employing my reversing and driving mechanism, having parts removed and others broken away to more clearly show the construction;

Fig. 2 is a detail view of the cam for operating the dog locking mechanism;

Fig. 4 is a sectional view taken approximately on the line 4—4 of Fig. 1; and

Fig. 5 is an end view of the machine.

Figure 3:
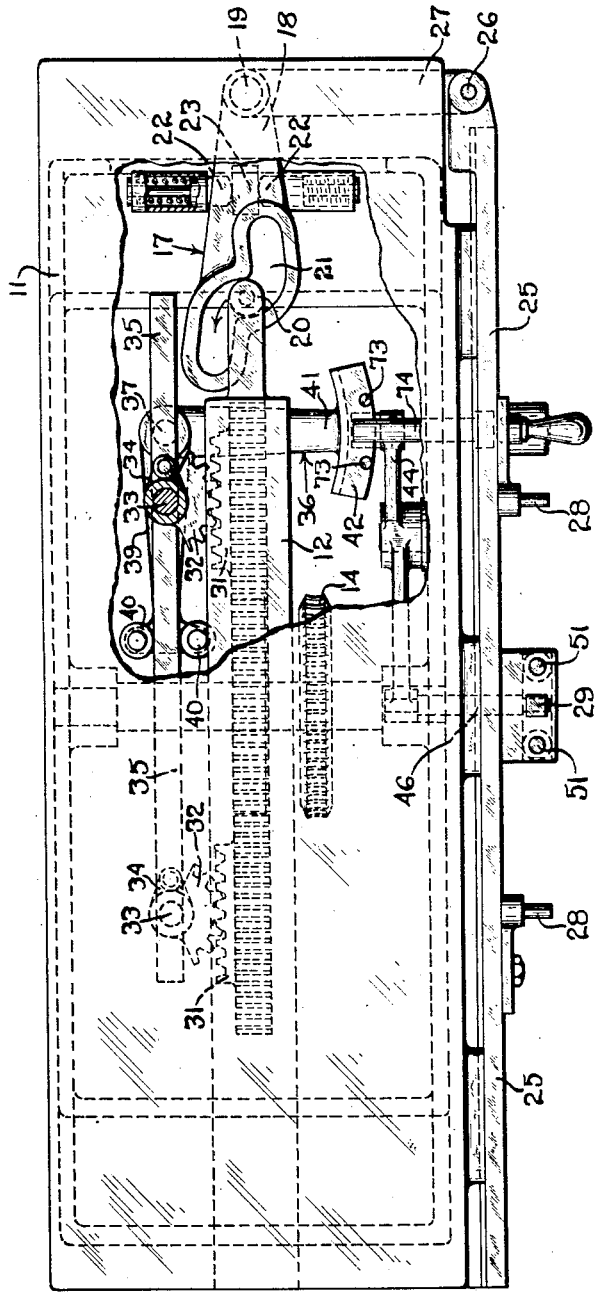
Fig. 3 is a plan view, having a part of the table broken away to more clearly show the parts.

In accordance with my invention, I provide a machine tool, such as a grinding machine, having a reciprocating table, with a reversing and driving mechanism which will eliminate the shocks due to reversal. To this end, I drive the reciprocating table by means of a slidable drive member mounted for movement relative to the table and which is driven by suitable mechanism, such as a worm and worm gear. To obtain the desired action at reversal, I provide a mechanism which will hold the drive member stationary during the normal movement of the table but upon reversal will permit the member to slide relative to the table, first at a slow rate and gradually increasing until the member moves rapidly enough to neutralize the driving effect upon the table. Similarly, when the reverse clutch is thrown, the member will move in the opposite direction at full driving speed relative to the table, but this relative movement will be gradually decreased until the table reaches its normal speed. This relative movement between the slidable drive member and the table is controlled by a cam so shaped and mounted that the slidable member drives the table through a rigid connection except at reversal. When the table approaches the end of its path, dogs on the machine serve through suitable connections to move the cam. This is preferably accomplished by mounting the dogs on an auxiliary slide bar for engagement with a fixed stop on the base of the machine, whereby further movement of the table actuates the cam, which is movably mounted on the table, and so causes relative motion between the table and the slidable member.

In the specific embodiment illustrated, I have shown a grinding machine having a reciprocable table 11 mounted on a suitable base 10 to slide on the usual V and flat ways.

The drive member for the table consists of a slide 12 which is mounted in a dovetailed slideway on the table and connected thereto as will be explained. This member in the form illustrated serves also as the drive rack, which is reciprocated by means of a spur gear 13 on the same shaft as the worm gear 14 meshing with the driving worm 15. The worm 15 is preferably rigid with the shaft 16 which is mounted for rotation in suitable bearings in the base 10.

The movement of the slidable drive rack 12 relative to the table 11 is controlled by a cam member 17, which preferably forms one arm of a bell crank member 18 pivoted at 19 to the under side of the table 11. In order that the motion of the cam 17 may be imparted to the rack 12, I provide the rack 12 with a cam follower 20 which is adapted to slide within the substantially S-shaped cam slot 21 on member 17. During the normal driving action, the cam follower 20 remains in the central portion of the cam slot. To prevent the cam follower moving before reversal and so insuring that the uniformly moving rack remains stationary relative to the table during the normal drive, I may provide the opposed spring pressed plungers 22 which are mounted on the under side of the table 11 and act against the opposite sides of the projection 23 of the bell crank 18, thus holding the cam member 17 in a central position. At this time the cam follower 20 is positioned where the opposite sides of the path are at right angles to the movement of the rack and any thrust due to the drive on the rack 12 will be directly in line with the cam pivot 19, and the rack will be held stationary relative to the table.

In order to permit a relative movement between the work table 11 and rack 12, I provide means for positively moving the cam member 17 from its central position. To this end a slide 25 is slidably mounted on the front face of the table 11. One end of this slide 25 is connected as by means of a pin 26 to the arm 27 of the bell crank member 18. It will be obvious that any relative movement between the slide 25 and the table 11 will cause the bell crank member 18 carrying the cam 17 to be shifted from its central position against the action of the spring pressed plungers 22 and thus start a relative movement between the table and rack, the nature of this movement depending upon the shape of the cam path.

To cause a relative movement between the slide 25 and the table 11, I may provide the slide 25 with adjustably mounted reversing dogs 28 which are adapted to engage a stop 29 rigidly fixed on a projection of the base 10. The table 11 will move until one of the dogs 28 comes in contact with the stop 29. At this point, the slide 25 is held stationary relative to the base 10 and the table 11 continues moving, causing the cam 17 to be shifted about its pivot and permit the rack 12 to slide relative to the table 11. As illustrated in Fig. 3, the cam path is so shaped on each side of its center that the relative motion between the rack and the table is slow at the start but gradually increases until the driving effect of the uniformly moving rack 12 has been neutralized and the table 11 comes gradually to rest. It is desirable that the two surfaces of the S-shaped cam approximate gravity curves in shape, as modified by the motion of the pivoted cam member and as determined by practical considerations observed in the operation of the machine.

When the table has come to rest, the reverse clutch is thrown and the rack 12 starts moving uniformly in the opposite direction at its normal full speed. The table being at rest the relative movement between the table and rack is at a maximum. It is now necessary to swing the cam in the opposite direction to gradually decrease this relative movement. To accomplish this I provide means for holding the slide 25 stationary relative to the base 10 during the period of starting the table, which preferably comprises a locking mechanism mounted on the machine base. To lock the slide 25 to the base, the side of the rack 12 is provided with two short racks 31 meshing with two gear segments 32 which are pivoted at 33 to the under side of the table 11. The gear segment members 32 are provided with short crank arms 34 to which the bar 35 is mounted. The bell crank member 36 is pivotally mounted at 37 to a projection 38 of the base 10. The arm 39 of the bell crank 36 is provided with follower rollers 40 which are adapted to engage opposite sides of the bar 35. The other arm 40 is provided with a cam slot 42 having a cam follower 43 which is mounted on one end of the lever 44, pivoted to the base at 45. The other end of the lever 44 carries the pin 46 which projects through the opening 47 in the base 10 and is secured to the connecting bar 48. The locking pins 51 are slidably mounted in a projection of the base 10 and their lower ends are secured to the connecting bar 48. It will be obvious that any motion of the rack 12 relative to the table 11 also moves the short racks 31 and the gear segments 32, thus moving the bar 35 either toward or from the rack 12. The movement of the bar 35 is transmitted through the follower rollers 40 and the bell crank 36 to cause a movement of the cam 42. The motion of the cam 42 through the lever 44 raises the locking pin 51 into the locked position and against the tension of the springs 50 locks one of the dogs 28 to the stop 29. The cam 42 is so shaped as to lock one of the dogs 28 at the beginning of the reversal period and to hold the dog in a locked position during the gradual slowing down and starting of the table until the table has reached full speed in the opposite direction.

In order to obtain a reversal, I may employ any of the well known reversing mechanisms. As illustrated, an extension of the shaft 16 is provided with pulleys 52 and 53 which are driven in opposite directions by any source of power. A double throw slidable clutch member 54 is located between the pulleys 52 and 53 and adapted to lock either one pulley or the other to the shaft 15. To operate the clutch 54, I provide the yoke arm 55, which is secured by means of the usual taper pin to the shaft 56 loosely mounted in a projection 57 of the base 10. The other end of the shaft 56 carries a crank arm 60 which is connected to the link 61. To throw the clutch 54, I utilize the usual reversing lever 62 pivotally mounted on the base 10 at 63. The link 61 is loosely connected to the lever 62 by means of a pin 64 thereon which engages an elongated slot 65 on the link.

It is desirable in reversing mechanisms of this type to provide some means for throwing the clutch 54 quickly into the reverse position after the reverse lever 62 has reached a certain point. This is usually accomplished by a load and fire mechanism. In my preferred construction as shown in the drawings, the reversing lever 62 is provided with a roller 66 which is adapted to be acted upon by the spring pressed plunger 68, which is slidably mounted in the bracket 69 secured to the base by means of screws and is provided with the spring 70 to hold it in contact with the roller 66. It will be obvious from this construction that when the reverse lever 62 has been shifted so that the roller passes the high point on the plunger 68, the action of the spring 70 will move the lever rapidly and as soon as the lost motion connection in the link 61 has been taken up, throw the clutch 54 into the reverse position.

To obtain a timed motion so that the reverse lever 62 will throw the clutch 54 at the right point, I may provide the arm 41 of the bell crank 36 with the two pins 73, which are adapted to engage the pin 74 projecting from the lever 62 and thus throw the clutch 54. The pins 73 are so positioned on the arm 41 as to cause reversal before the cam follower has reached the end of the cam path. Since reversal will not take place immediately when the table has stopped, I permit a period of rest by so shaping the cam path in its outer portion that further movement of the rack after the table has stopped may take place without affecting the table. This would amount to a straight line path added to the end of a gravity curve of the cam path.

In explanation of the operation of my driving and reversing mechanism, assume that the table is traveling in the direction of the arrow as shown in Fig. 1 and that the dog 28 comes in contact with the stop lever 29. The table 11 will continue to travel in the direction of the arrow while the slide 25 remains stationary. This relative movement between the slide 25 and the table 11 causes the cam 17 to be shifted from the central position shown in Fig. 3 and permits a motion of the cam follower 20 within the cam slot 21 and thereby permit the rack 12 to move in the same directions as that of the table 11. Due to the peculiar shape of the cam 17 the cam follower 20 moves in the direction of arrow (Fig. 3) and permits relative motion between the uniformly moving rack 12 and the table 11 which gradually increases until it neutralizes the driving effect of the rack 12 on the table 11, at which point the table is at rest. The table is gradually stopped before the cam follower reaches the end of the cam slot 17 but the rack continues to move at a uniform rate until the reverse clutch 52 is thrown, after which the rack will start traveling in the opposite direction.

During the movement of the rack 12 relative to the table 11, the bar 35 is swung away from the rack by means of the gear segments 32 cooperating with the short racks 31. The motion of the bar 35 is transmitted through the follower rollers 40 to the cam member 42. The cam member 42 is so shaped that as it moves from its central position it will raise the locking pin 51 by means of the cam follower 43 and the lever 44 which is operatively connected to the connecting bar 48. By the time the dog 28 is locked to the stop lever 29 the cam lever 42 has moved so that one of the pins 73 engages the pin 74 and starts to move the reversing lever 62. The movement of the lever 62 continues until the roller 66 has passed the high point on the plunger 68 and then under the action of the spring 70 the reverse lever 62 throws the reverse clutch 52.

As soon as the clutch is thrown, the rack 12 starts in the opposite direction at a maximum speed relative to the table 11. Due to reversing the thrusts on the rack, the cam follower 21 then starts moving within the cam slot 17 toward its central position. Its motion will be rapid at first, but due to the shape and swinging of the cam 17, caused by the relative movement between the locked slide 25 and the moving table 11, this will gradually be decreased and the driving effect of the rack upon the table increased until the table reaches a normal speed at which point the cam follower 20 will have come to its central position and the table will be driven normally at full speed.

The unlocking of the slide 25 takes place during the starting period so that by the time the cam follower 20 reaches its central position the slide 25 will be unlocked so as to permit the slide to travel with the table 11 during the normal movement. As the rack 12 starts moving in the reverse direction, the bar 35 is moved toward the rack 12 and swings the cam 42 which in turn allows the locking pin 51 to drop under the action of the spring 50 and the cam 42 to the unlocked position, so that by the time the cam follower has reached the central position of the cam 17 the dog 28 will be unlocked and permit the slide 25 to move with the table 11 during the normal movement.

I claim:

1. In a machine tool having a reciprocable table, a driving and reversing mechanism therefor comprising a driver, means to move the same at a uniform velocity throughout the stroke of the table and a mechanical, rigid connection between the driver and the table including a positively actuated device which permits a predetermined relative movement therebetween and causes the table to be started gradually into motion and thereafter driven at an invariable rate.

2. In a machine tool having a reciprocable table, a driving and reversing mechanism therefor comprising a uniformly reciprocated driver, a mechanical, rigid connecting device between said driver and table arranged to permit a predetermined relative movement therebetween, and means for automatically operating said device to cause the table to be stopped and started gradually and thereafter driven at an invariable and uniform rate.

3. In a machine tool having a reciprocable table, a driving member which is movable longitudinally relative to said table, means to move said member at a uniform rate, and a cam controlling device connecting said member and table, effective to permit a gradually retarded relative movement between the table and the uniformly moving member to accelerate the table gradually from rest to full speed and thereafter drive the table fixedly with the driving member.

4. In a machine tool having a reciprocable table, a driving member movable longitudinally relative to the table, means to reciprocate said member at a uniform rate and connections between said member and table including a cam mechanism effective to cause the table to be started gradually from rest to full speed while said member is moving at a normal rate.

5. In a machine tool having a reciprocable table, a driving member movable longitudinally relative to the table, means to reciprocate said member at the uniform table speed and connections between the table and member including a normally inoperative cam mechanism effective at reversal to permit a relative movement between the table and member and bring the table gradually to rest and thereafter accelerate the table to normal speed in the opposite direction.

6. In a machine tool having a reciprocable table, a driving member movable longitudinally relative to the table, means to reciprocate said member at a uniform rate, connections between said member and table, including a cam mounted in a normally inoperative position, effective to give an accelerated relative motion between said member and table to bring the table gradually to a stop, and means operated by movement of the table to render said cam effective.

7. In a machine tool having a reciprocable table, a driving member movable longitudinally relative to the table, means including a clutch to reciprocate said member through a variable stroke at a uniform rate, a normally inoperative cam mechanism connecting the table and driving member, and automatically actuated means effective at reversal to move the cam before the clutch is thrown and cause a relative movement between the table and the member permitting the table to be brought gradually to rest.

8. In a machine tool having a reciprocable work table, a driving rack movable longitudinally relative to the table, means including a clutch to reciprocate the rack at a uniform rate, connections between the table and rack comprising a normally inoperative cam member effective at reversal of motion of the table to cause a relative movement between the rack and table and permit a gradual slowing down of the table and thereafter a gradual acceleration of the table to its normal speed, and automatically operated means to render said cam member effective before the clutch is thrown.

9. In a machine tool having a reciprocable table, a drive rack movable longitudinally relative to the table, means to reciprocate said rack at a uniform rate through a variable stroke, a cam and cam follower mounted on and connecting the table and rack, means to hold the cam in a fixed position relative to the table during the normal driving stroke, and means effective at reversal to positively move said cam and cause a relative movement between the table and rack, said cam being constructed and arranged to permit the table to be brought gradually to rest and thereafter started gradually to normal speed.

10. In a machine tool having a reciprocable table, a drive rack movable longitudinally relative to the table, means including a clutch to reciprocate said rack at a uniform rate, means cooperating with said rack to shift the clutch, a cam device connecting the table and rack which is normally inoperative to permit the table and rack to move together, and means operated by the motion of the table to positively move the cam before and after the clutch is thrown and cause a relative movement between the table and rack, said cam device being constructed and arranged to permit the table to be brought gradually to rest and thereafter started gradually from rest to full speed.

11. In a machine tool having a reciprocable table, a drive rack movable longitudinally relative to the table, means including a clutch to reciprocate said rack at a uniform speed, means to throw the clutch, a normally inoperative movable member connecting said rack and table, and a dog on said table effective at reversal to positively engage and move said member, said parts being constructed and arranged so that movement of said member causes a relative movement between the table and rack and permits the table to be gradually stopped and thereafter gradually started to full speed.

12. In a machine tool having a reciprocable table, a drive rack movable longitudinally relative to the table, means including a clutch to reciprocate said rack at a uniform speed, means cooperating with said rack to throw the clutch, a normally inoperative cam member pivoted to the table to connect said rack and table, and an auxiliary slide on said table effective at reversal to positively swing said cam member, said cam parts being constructed and arranged to cause a relative movement between the table and rack to permit the table to be gradually stopped and thereafter gradually started to full speed.

13. In a machine tool having a reciprocable work table, a drive rack movable longitudinally relative to the table, means including a clutch to reciprocate said rack at a uniform rate, a normally inoperative cam member pivotally mounted on the table and a cam follower on the rack to connect said rack and table, a slide mounted on said table and connected with said cam member, adjustable dogs on said slide, a stop on the base to cooperate with said dogs and means comprising a locking mechanism to lock one of said dogs to said stop to relatively move said slide and table and positively swing said cam member, said cam parts being constructed and arranged to cause a relative movement between the table and rack and permit the table to be gradually stopped and thereafter gradually started to full speed.

Signed at Westboro, Massachusetts, this 3rd day of May, 1922.

WARREN F. FRASER.